US008383941B2

(12) United States Patent
Goodman

(10) Patent No.: US 8,383,941 B2

(45) Date of Patent: Feb. 26, 2013

(54) HEADPHONE TANGLE PREVENTION APPARATUS

(76) Inventor: Michelle Goodman, Evanston, IL (US)

( * ) Notice: Subject to any disclaimer, the term of this patent is extended or adjusted under 35 U.S.C. 154(b) by 608 days.

(21) Appl. No.: 12/557,325

(22) Filed: Sep. 10, 2009

(65) Prior Publication Data

US 2011/0056721 A1 Mar. 10, 2011

(51) Int. Cl.

| | |
|---|---|
| ***H02G 3/04*** | (2006.01) |
| *H01B 7/29* | (2006.01) |
| *H01B 11/06* | (2006.01) |

(52) U.S. Cl. ........................................ 174/68.3; 174/36

(58) Field of Classification Search .................... 174/36, 174/68.3

See application file for complete search history.

(56) References Cited

U.S. PATENT DOCUMENTS

| | | | | |
|---|---|---|---|---|
| 7,202,414 | B2 * | 4/2007 | Johnson | 174/36 |
| 7,622,670 | B1 * | 11/2009 | Sanderson et al. | 174/36 |
| 8,039,750 | B2 * | 10/2011 | Magnusson | 174/135 |

* cited by examiner

*Primary Examiner* — Chau Nguyen
*Assistant Examiner* — Theron Milliser
(74) *Attorney, Agent, or Firm* — Caliber IP, LLC

(57) ABSTRACT

A method and apparatus for keeping headphone and earpiece cables from tangling is disclosed. The apparatus may include a flexible sleeve capable of moving relative to a headphone cord to restrict the movement of earpiece cables associated with the headphone cord.

5 Claims, 2 Drawing Sheets

HEADPHONE TANGLE PREVENTION APPARATUS

FIELD OF THE INVENTION

The present invention relates generally to a method and apparatus for preventing the tangling of headphones, and more specifically relates to a flexible sleeve for restricting the movement of headphone earpiece cables.

BACKGROUND OF THE INVENTION

Stereo headphones for MP3 players, radios, and other devices require two cables, one for each "speaker" or earpiece. These cables have to be long enough to enable the device to be carried in different configurations reaching both ears. Headphones are often loosely stuffed into the pocket or bag of a user when not in use, leading to frustrating tangling and catching of the cables.

SUMMARY OF THE INVENTION

The present invention relates to one or more of the following features, elements or combinations thereof.

A headphone tangle prevention device is disclosed. In one embodiment, the apparatus may comprise a flexible sleeve surrounding a headphone cable. The sleeve may be urged along the cable with an elastic end piece holding one end in place. Extending the sleeve along substantially the entire cable may restrict the earpiece cables, thereby preventing tangling. The sleeve may also be consolidated at one end of the cable to reveal the earpiece cables for use. The apparatus may further comprise an installer to ease passing the device and installing the device over a headphone jack.

DETAILED DESCRIPTION OF EMBODIMENTS OF THE INVENTION

Figure 1:
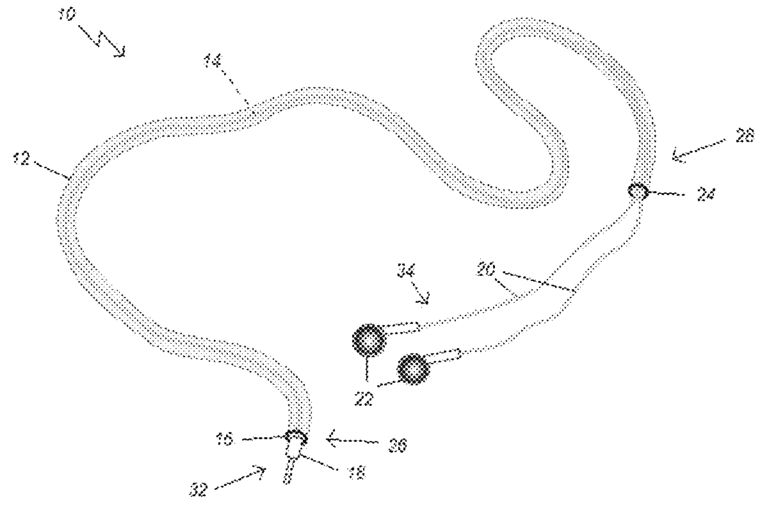
FIG. 1 is a perspective view of a headphone tangle prevention apparatus in accordance with one embodiment of the present invention. The apparatus is depicted in a configuration for headphone use.
Figure 2:
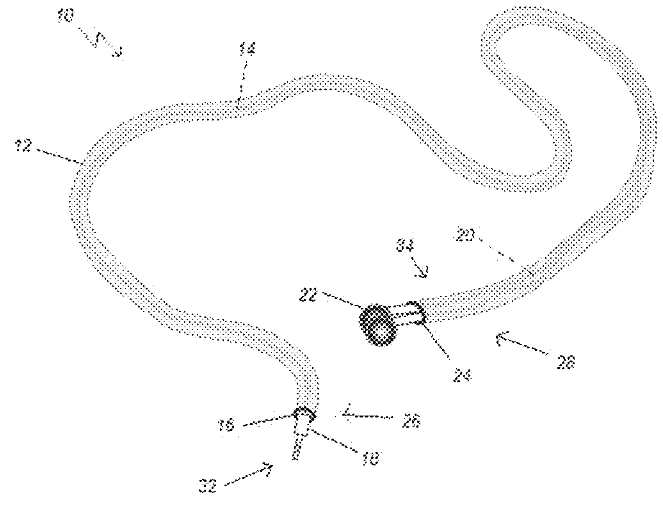
FIG. 2 is a perspective view of the apparatus depicted in FIG. 1 with the apparatus in its headphone storage configuration.

A headphone tangle prevention apparatus 10 is depicted in FIGS. 1 and 2 according to one embodiment of the present invention. The apparatus 10 may comprise a sleeve 12 manufactured of a flexible material such as tubular braid or tubular crinoline. Sleeve 12 may be slightly larger in diameter and roughly equivalent in length to headphone cable 14. The fabrication material and sleeve 12 size make it possible to slip sleeve 12 along the exterior of headphone cable 14 for either use or storage. The headphone cable 14 illustratively has an engagement end 32 for engaging to an electronic device and an earpiece end 34 including earpiece cables 20. The apparatus 10 may further comprise flexible elastic rings forming end pieces 16, 24 for keeping sleeve 12 attached to the headphone cable engagement end 32 at the sleeve 12 first end 26, and adjustable but positioned to a desired length at sleeve 12 second end 28. End piece 16 at first end 26 is illustratively shown positioned on male headphone jack 18.

In FIG. 1, sleeve 12 is shown consolidated toward engagement end 32 of headphone cable 14 such that left and right earpiece cables 20 are shown exposed in relation to sleeve second end 28. This position permits a user to place left and right earpieces 22 in the user's ears, such as for headphone use.

In FIG. 2, apparatus 10 is depicted in its storage configuration. In such a storage configuration, sleeve 12 is illustratively lengthened and extended substantially along the length of earpiece cables 20. The lengthening can be achieved by pulling second end 28 toward ear pieces 22 such that sleeve 12 reaches an extended length substantially as long as cable 14.

As shown in FIG. 2, in the storage configuration, end piece 24 of apparatus 10 is positioned substantially adjacent to ear pieces 22. Such a configuration permits a user to place the headphones (with apparatus 10) in his or her pocket, or some other small compartment, while greatly reducing the likelihood of the tangling of earpiece cables 20 and/or headphone cable 14.

Figure 3:
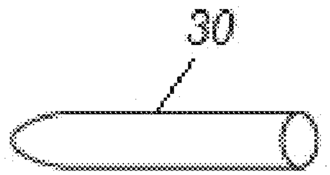
FIG. 3 is a perspective view of an installer for the apparatus depicted in FIGS. 1 and 2.

FIG. 3 depicts an installation device 30 that may accompany the apparatus 10. Installation device 30 is in the form of a small "sock" or cap that fits over the male headphone jack 18 of the headphones, enabling the user to feed end pieces 16, 24 and sleeve 12 around installation device 30 and onto the headphone cable 14. Installation device 30 may be constructed of a rigid rubber or plastic material. Installation device 30 may be formed from polypropylene tubing such as that used to make common drinking straws, whereby one end of the tube is kept open and one end is fused flat and then trimmed to form a curved end. To accommodate more difficult headphones, such as those with L-shaped plugs, the apparatus 10 may be installed during manufacture of the headphones.

Sleeve 12 is constructed substantially as follows. As disclosed above, sleeve 12 is disclosed as a flexible and variable-length material such as tubular crinoline. The crinoline may be formed in a weave such that the variable length of apparatus 10 is facilitated. Because crinoline is traditionally formed to have a longitudinally disposed member (not shown) that restricts longitudinal compression of the crinoline, the preferred embodiment has the longitudinal member removed. Tubular crinoline of appropriate diameter may be purchased from Jason's Inc. Trims and Novelties, as model number 1604, keeping in mind that the longitudinally disposed member should be removed for optimal performance of sleeve 12.

End pieces 16, 24 are illustratively "O" rings that can be purchased from Danco Perfect Match as model numbers 5 and 7. The elastic rings 16, 24 are mounted on sleeve 12 in substantially the following fashion. Crinoline is cut to the appropriate length and the longitudinally disposed member is removed. A plastic tube is inserted into each end 26, 28 of the sleeve 12 to hold it open to a specific diameter. The ends 26, 28 are dipped into Plasti Dip, purchased from Plasti Dip International. When dry, the ends 26, 28 are trimmed smooth and end pieces 16, 24 of the appropriate diameter are placed on each end 26, 28 of the sleeve 12. The ends are dipped again to hold the end pieces 16, 24 in place. When dry, the plastic tube is removed and the ends 26, 28 are dipped again. When dry, any excess Plasti Dip is trimmed away.

While the disclosure is susceptible to various modifications and alternative forms, specific exemplary embodiments thereof have been shown by way of example in the drawings and have herein been described in detail. It should be understood, however, that there is not intent to limit the disclosure to the particular embodiments disclosed, but on the contrary, the intention is to cover all modifications, equivalents, and alternatives falling within the spirit and scope of the disclosure as defined by the appended claims.

What is claimed is:

1. An apparatus for decreasing headphone and ear piece cable tangling, the apparatus comprising:

a headphone cable comprising an engagement end, an ear piece end, and a junction therebetween, wherein at the junction, the headphone cable bifurcates into two independent ear piece cable ends, and wherein each ear piece cable end terminates in an ear piece;

a single flexible sleeve defining a diameter slightly larger than the diameter of the headphone and both ear piece cables, the sleeve having a variable length, wherein the sleeve length may be adjusted between a first length in which it is approximately half the length of the headphone cable and a second length in which the sleeve length is approximately the entire length of the headphone cable and ear piece cables, thereby encompassing the headphone cable, the junction, and a substantial portion of the ear piece cables.

2. The apparatus of claim 1, wherein the sleeve has a first end configured to engage the engagement end of the headphone cable.

3. The apparatus of claim 2, wherein the sleeve has a second end that is movable along the headphone cable.

4. The apparatus of claim 1, further comprising an installation device capable of fitting over a portion of the engagement end of the headphone cable.

5. The apparatus of claim 1, wherein the sleeve is at least partially manufactured of a material selected from the group consisting of tubular braid and tubular crinoline.

* * * * *